United States Patent [19]
Fujinami et al.

[11] Patent Number: 5,594,552
[45] Date of Patent: Jan. 14, 1997

[54] APPARATUS AND METHOD FOR PRODUCING DOWNWARDS COMPATIBLE VIDEO SIGNALS WITH INCREASED VERTICAL RESOLUTION, AND APPARATUS FOR REPRODUCING AND DISPLAYING SAME

[75] Inventors: Yasushi Fujinami; Jun Yonemitsu, both of Kanagawa, Japan

[73] Assignee: Sony Corporation, Tokyo, Japan

[21] Appl. No.: 242,352

[22] Filed: May 13, 1994

Related U.S. Application Data

[62] Division of Ser. No. 144,749, Oct. 27, 1993.

[30] Foreign Application Priority Data

Oct. 30, 1992 [JP] Japan ..................... 4-316302

[51] Int. Cl.$^6$ ................. H04N 5/76; H04N 7/01
[52] U.S. Cl. ............... 386/131; 348/446; 386/46
[58] Field of Search ..................... 348/460, 445, 348/556, 558, 461, 466, 448, 449, 97, 96; 358/335, 342, 310

[56] References Cited

U.S. PATENT DOCUMENTS

| 4,496,997 | 1/1985 | Ohtsuki ........................ 360/13 |
| 4,837,626 | 6/1989 | Nishiyama et al. ............. 348/446 |
| 5,122,885 | 6/1992 | Yoshioka et al. ............... 358/310 |
| 5,305,113 | 4/1994 | Iwamura et al. ................ 358/812 |

*Primary Examiner*—Thai Q. Tran
*Assistant Examiner*—Robert Chevalier
*Attorney, Agent, or Firm*—Limbach & Limbach L.L.P.

[57] ABSTRACT

Apparatus for deriving from a motion picture film for transfer to a video recording medium a video signal having increased vertical resolution for display using progressive scanning. In the apparatus, a deriving system derives the video signal from the motion picture film; a flag signal generating circuit generates a flag signal indicating that the video signal is for display using progressive scanning; and a recording system records the video signal and the flag signal in the recording medium. In a method of deriving from an interlaced high-definition video signal an interlaced standard-definition video signal having increased vertical resolution, the interlaced high-definition video signal is converted into a progressive high-definition video signal. The number of pixels in the progressive high-definition video signal is reduced to provide a progressive standard-definition video signal, which is converted into the interlaced standard-definition video signal. An apparatus for reproducing a video signal recorded on a recording medium includes a system for reproducing the video signal from the recording medium, and a circuit for extracting from the reproduced video signal a flag signal indicating a display scanning mode for the video signal. A display apparatus includes a circuit for receiving a flag signal indicating a display scanning mode for the video signal, and for generating a control signal; and a circuit, responsive to the control signal, for displaying the video signal in the display scanning mode.

20 Claims, 16 Drawing Sheets

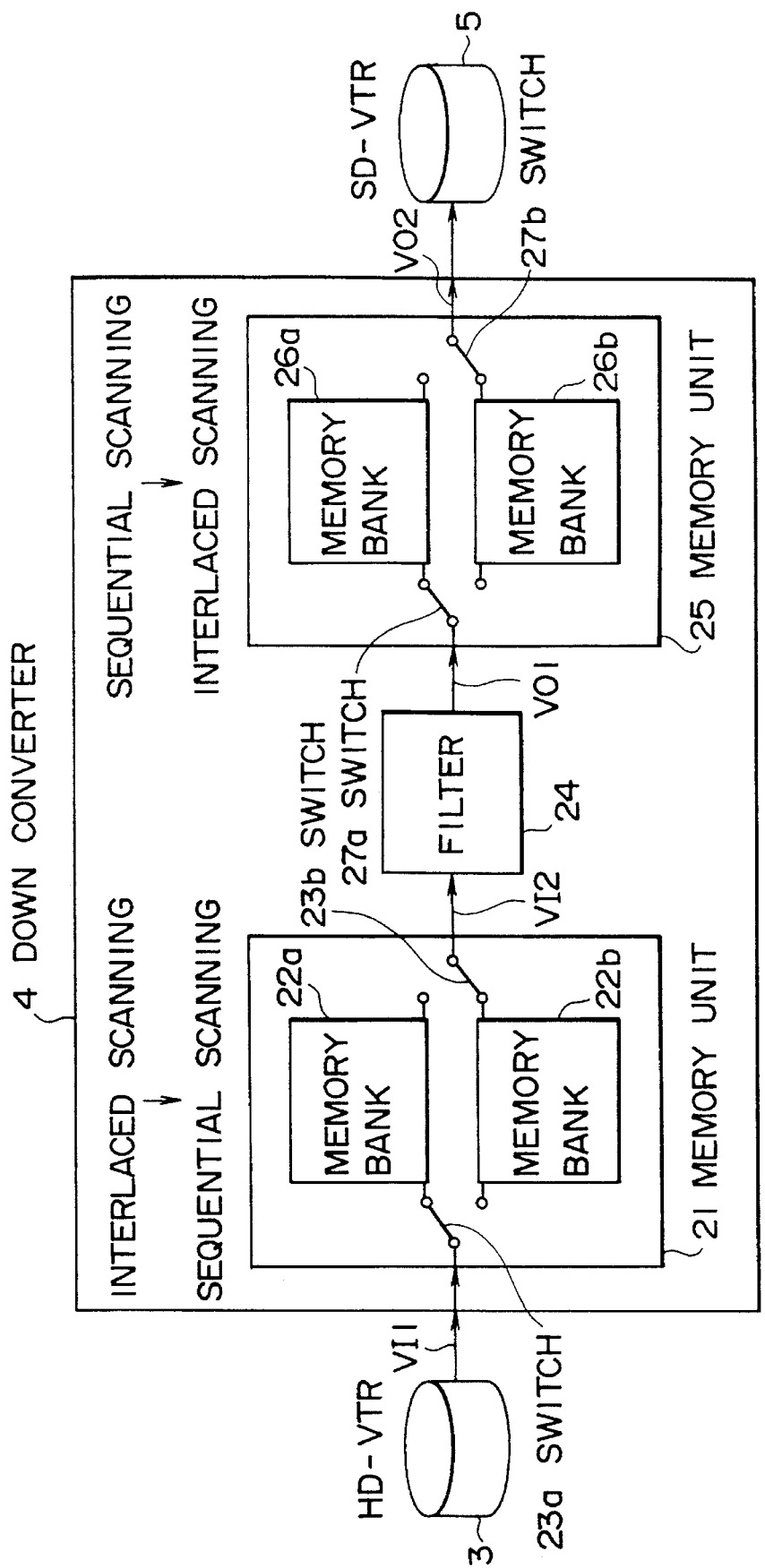

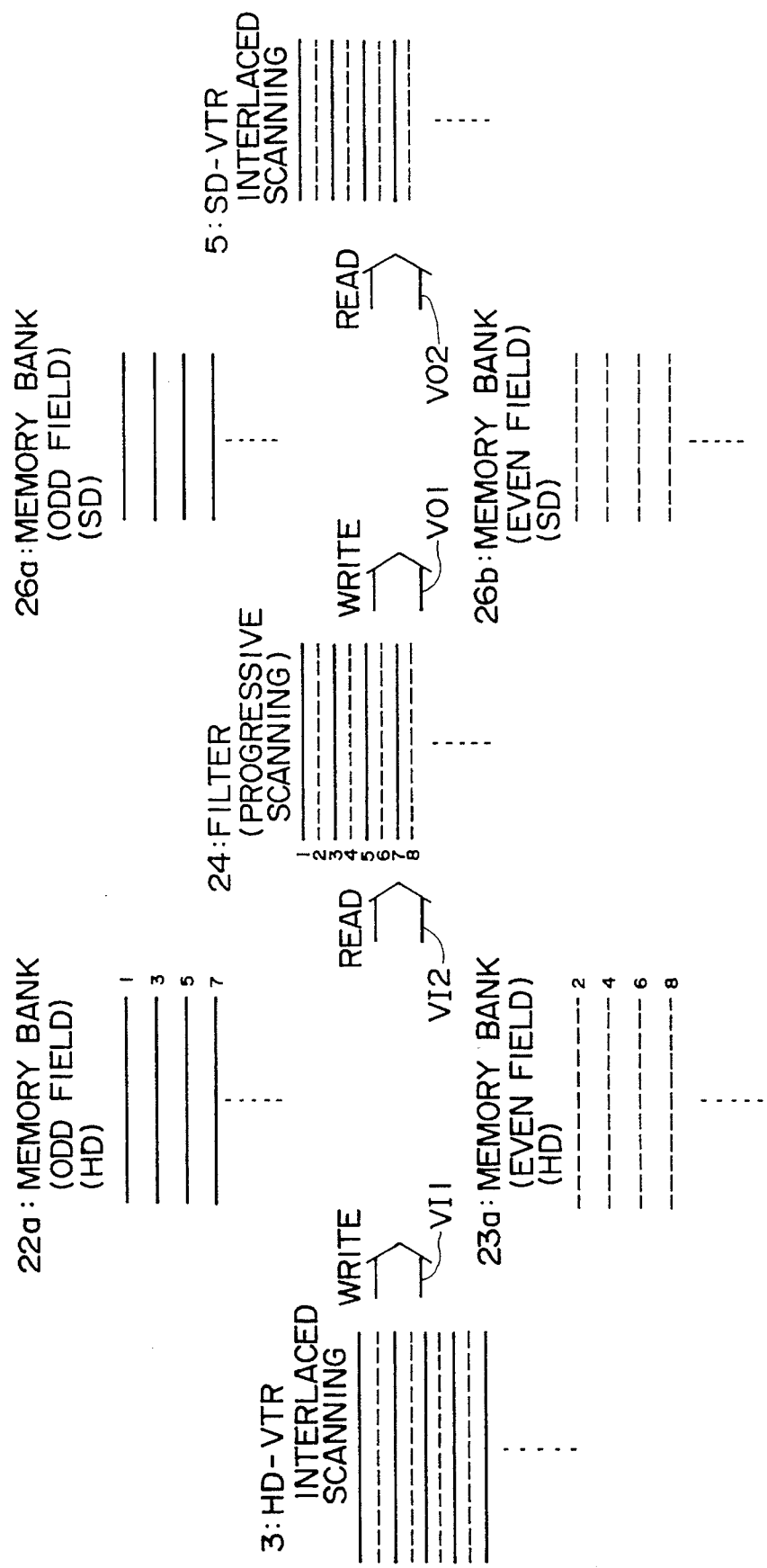

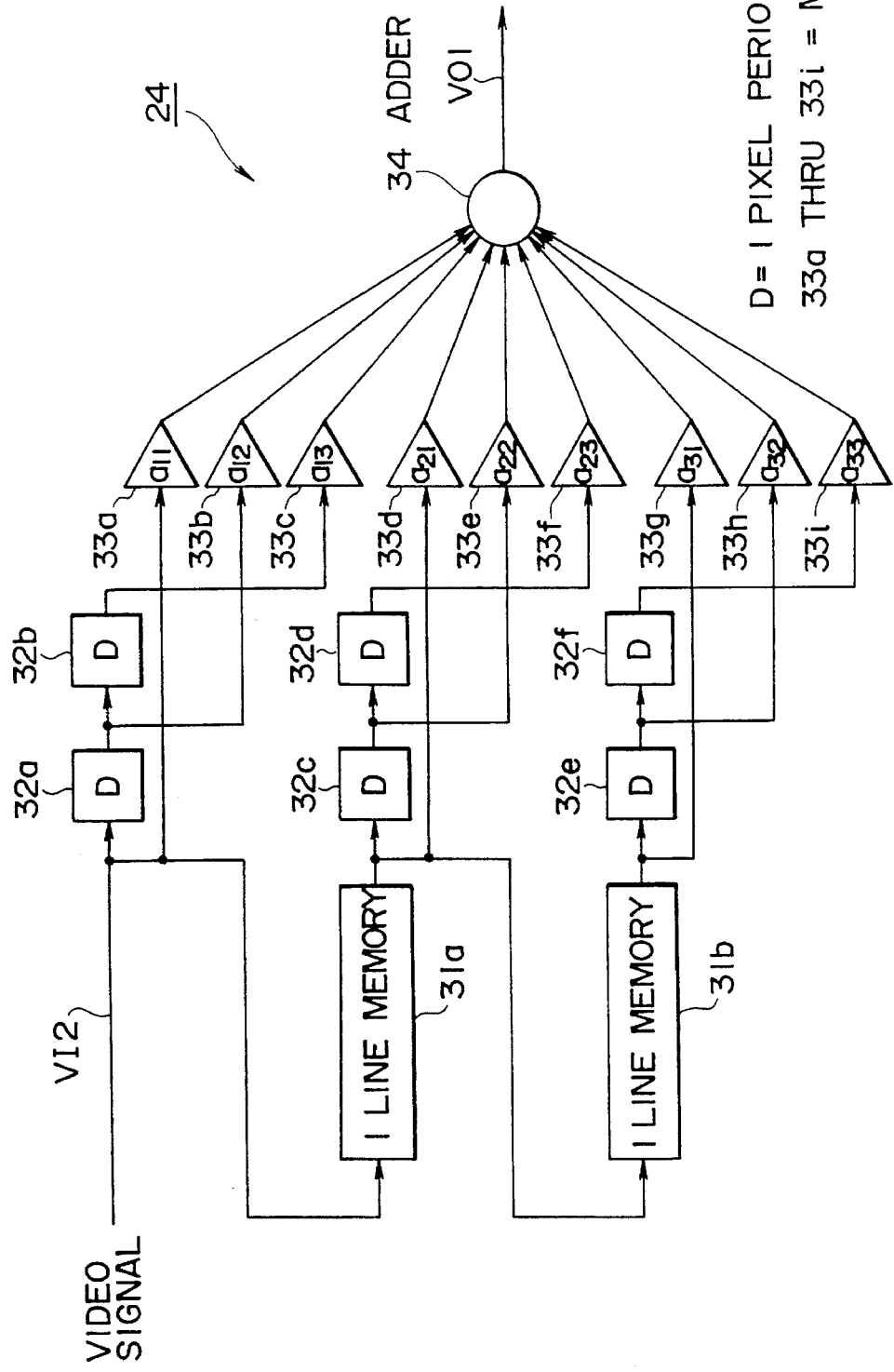

FIG. 7

```
PIXEL ⟶ X  X  X  X  X  X  X
        X  X  A  B  C  X  X
        X  X  D  E  F  X  X
        X  X  G  H  I  X  X
        X  X  X  X  X  X  X
```

F I G. 9A

```
video_sequence() {
        next_start_code()
        sequence_header()
        if (nextbits() == extension_start_code) {          ····MPEG2 syntax
                sequence_extension()
                do {
                        extension_and_user_data (0)
                        do {
                                if (next_bits() == group_start_code) {
                                        group_of_pictures_header()
                                        extension_and_user_data (1)
                                }
                                picture_header ()
                                extensions_and_user_data (2)
                                picture_data()
                        } while ((next_bits() == picture_start_code) ||
                                    next_bits() == group_start_code))
                        if (nextbits() != sequence_end_code) {
                                sequence_header ()
                                sequence_extension()
                        }
                } while (nextbits() != sequence_end_code)
        } else {                                            ····MPEG I syntax
                do {
                        do {
                                group_of_pictures_header ()
                                if (next_bits() == user_data_start_code)
                                        user_data ()
                                do {
                                        picture_header ()
                                        if (next_bits() == user_data_start_code)
                                                user_data ()
                                        picture_data ()
                                } while ( next_bits() == picture_start_code)
                        } while ( next_bits() == group_start_code )
                        if (nextbits() != sequence_end_code)
                                sequence_header ()
                } while ( nextbits() != sequence_end_code )
        }
        sequence_end_code
}
```

FIG. 9B

```
extension_and_user_data(i){                                   No. of bits Mnemonic
     while ( ( nextbits() == extension_start_code) II
                  ( nextbits() == user_start_code) ) {
           if ( nextbits() == extension_start_code )
                 extension_data ( i )
           if ( nextbits() == user_start_code )
                 user_data ()
           }
     }
}
```

FIG. 9C

EXTENSION ID

| EXTEN-SION ID | NAME | FOLLOWS SEQUENCE HEADER (i=0) | FOLLOWS GOP HEADER(i=1) | FOLLOWS PICTURE HEADER(i=2) |
|---|---|---|---|---|
| 0000 | reserved | | | |
| 0001 | Sequence Extension | Always | | |
| 0010 | Sequence Display | Optional | | |
| 0011 | Quant Matrix | Optional | | Optional |
| 0100 | Sequence Frequency | Conditional | | |
| 0101 | Sequence Spatial | Conditional | | |
| 0110 | 10 bit input ? | | | |
| 0111 | Picture Pan-Scan | | | Optional |
| 1000 | Picture Coding | | | Always |
| 1001 | Picture Spatial | | | Optional |
| 1010 | FF/FR ???? | | | |
| 1011 | reserved | | | |
| ... | ... | | | |
| 1111 | reserved | | | |

F I G. 9D

| | No. of bits | Mnemonic |
|---|---|---|
| picture_coding_extension() { | | |
|     extension_start_code | 32 | bslbf |
|     extension_id | 4 | uimsbf |
|     forward_horizontal_f_code | 4 | uimsbf |
|     forward_vertical_f_code | 4 | uimsbf |
|     backward_horizontal_f_code | 4 | uimsbf |
|     backward_vertical_f_code | 4 | uimsbf |
|     intra_dc_precision | 2 | uimsbf |
|     picture_structure | 2 | uimsbf |
|     top_field_first | 1 | uimsbf |
|     frame_pred_frame_dct | 1 | uimsbf |
|     concealment motion vectors | 1 | uimsbf |
|     q_scale_type | 1 | uimsbf |
|     intra_vic_format | 1 | uimsbf |
|     alternate_scan | 1 | uimsbf |
|     number_of_field_displayed_code | 1 | uimsbf |
|     chroma_postprocessing_type | 1 | uimsbf |
|     non_interlaced_frame | 1 | uimsbf |
|     composite_display_flag | 1 | uimsbf |
|     if (composite_display_flag) { | | |
|         v-axis | 1 | uimsbf |
|         field_sequence | 3 | uimsbf |
|         sub_carrier | 1 | |
|         burst_amplitude | 7 | uimsbf |
|         sub_carrier_phase | 8 | uimsbf |
|     } | | |
|     next_start_code () | | |
| } | | |

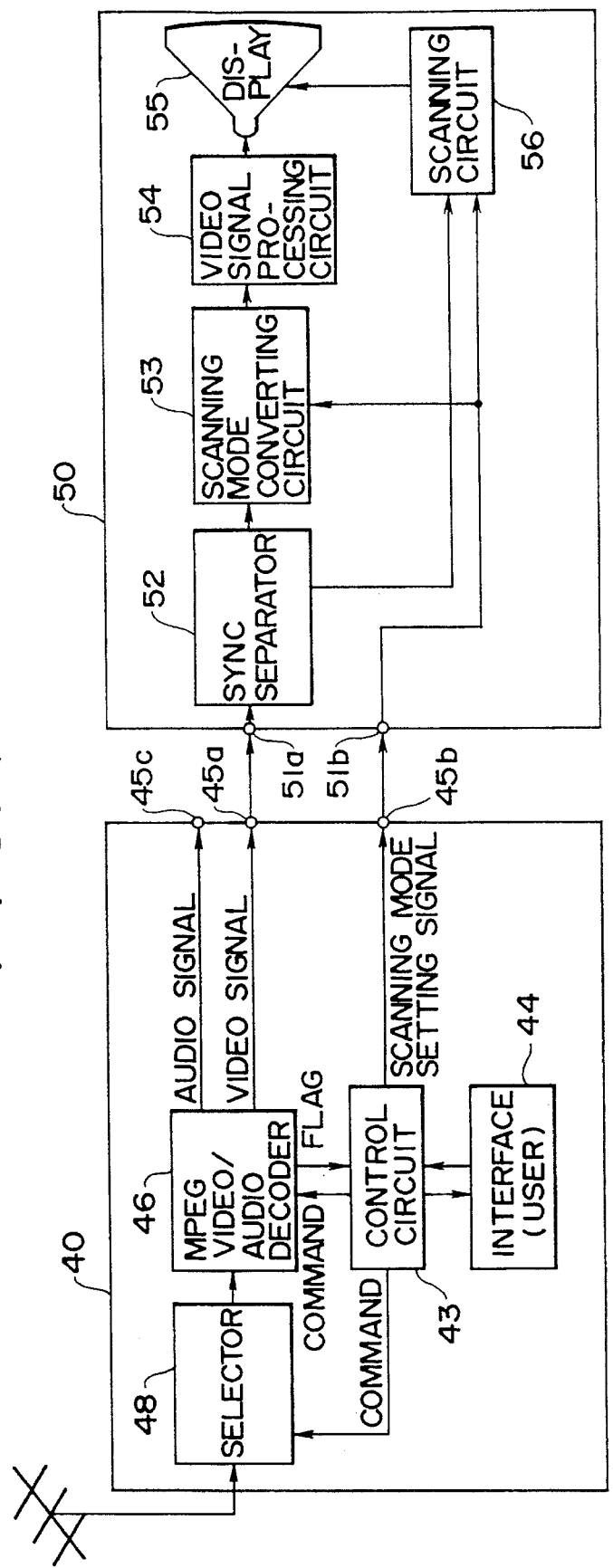

APPARATUS AND METHOD FOR PRODUCING DOWNWARDS COMPATIBLE VIDEO SIGNALS WITH INCREASED VERTICAL RESOLUTION, AND APPARATUS FOR REPRODUCING AND DISPLAYING SAME

This is a divisional of application Ser. No. 08/144,749, filed Oct. 27, 1993, now allowed.

FIELD OF THE INVENTION

The present invention relates to an image converting apparatus, an image duplicating apparatus, an image reproducing apparatus and an image display for converting images recorded on a motion picture film into image signals of a television broadcasting system, recording the image signals of a television broadcasting system on a recording medium, such as a tape or a disk, reproducing the images recorded on the recording medium and displaying the reproduced images.

BACKGROUND OF THE INVENTION

FIG. 1 is a block diagram of a telecine system for transferring a motion picture film to a consumer recording medium, such as a video cassette or a video disk. The high-definition (FID) telecine apparatus 61 is provided internally with a high-definition image sensor, not shown, on which an image of each frame of the motion picture film is formed, and which is generates an interlaced high-definition video signal in which each frame has 1125 horizontal scanning lines, and has an aspect ratio of 16:9. For brevity, horizontal scanning lines will from now on be called "lines."

The interlaced high-definition video signal has an interlace ratio of 2:1, i.e., each frame of the video signal consists of two overlapping fields, offset from one another by one line. In the following description, a reference to an interlaced video signal will be understood to refer to an interlaced video signal with an interlace ratio of 2:1.

Generally, when the motion picture film 1 reproduced, for example by the HD telecine apparatus 61, it is transported at a rate that provides a frame rate of 24 Hz. On the other hand, the image sensor in the HD telecine apparatus 61 produces an interlaced high-definition video signal with a field rate of 60 Hz. Therefore, ten fields, i.e., five frames, of the interlaced high-definition video signal must be derived from each four frames of the motion picture film.

The HD telecine apparatus 61 performs 2–3 pulldown to derive an interlaced high-definition video signal with a field rate of 60 Hz from the motion picture film 1. In this, ten fields, i.e., five frames, of the high-definition video signal are derived from four frames of the motion picture film 1.

In 2–3 pulldown, a different number of fields of the high-definition video signal is derived from alternate frames of the motion picture film. Two fields of the interlaced high-definition video signal, i.e., the first and second fields of the high-definition video signal, are derived from the first frame of the motion picture film 1. Then, three fields of the interlaced high-definition video signal, i.e., the third, fourth and fifth fields of the high-definition video signal are derived from the second frame of the motion picture film 1. This process is then repeated.

The interlaced high-definition video signal from the telecine apparatus 61 is fed into the high-definition video recorder (HD-VTR) 3 where it is recorded on a recording medium, not shown, such as a video tape.

The interlaced high-definition video signal is reproduced by the HD-VTR 3, and is fed to the down-converter 62. As shown in FIG. 2, the down-converter 62 comprises the field memories 81 and 82, and the filter 83. The down-converter 62 reduces the number of lines and the number of pixels to convert the input interlaced high-definition video signal into a video signal of the type used in normal television broadcasting, with 525 lines, an aspect ratio of 4:3, and an interlace ratio 2:1. Such a signal will from now on be referred to as "an interlaced standard-definition video signal."

The field memory 81 of the down-converter 62 temporarily stores each frame of the input interlaced high-definition video signal. The interlaced high-definition video signal is read from the field memory 81 in timed read cycles and fed to the filter 83.

The filter 83, which is, for example, a 3×3 two-dimensional filter, thins out the lines and pixels of the interlaced high-definition video signal by filtering to convert the input interlaced high-definition video signal into an interlaced standard-definition video signal. Each frame of the interlaced standard-definition video signal provided by the filter 83 is stored temporarily in the field memory 82.

The fields of the interlaced standard-definition video signals are sequentially read out of the field memory 82 in the down converter 4 and are fed to the standard-definition video recorder (SD-VTR) 5, shown in FIG. 1, which records them on a recording medium, not shown, such as a video tape.

By the process just described, the motion picture film 1 is converted into an interlaced standard-definition video signal that can be reproduced on a regular, standard-definition television set, and the interlaced standard-definition video signal is recorded by the SD-VTR 5.

The interlaced standard-definition video signal is reproduced by the SD-VTP, 5, and is fed into the encoder 70. The encoder 70 converts the interlaced standard-definition video signal into a composite video signal, such as an NTSC-format composite video signal, or a PAL-format composite video signal, which is fed to the duplicating apparatus 63. The duplicating apparatus 63 records the composite video signal on the consumer-format video cassette 72 or the video disk 82.

Alternatively, in the motion picture duplicating system shown in FIG. 1, the motion picture film 1 is converted into an interlaced standard-definition video signal with 525 lines, an aspect ratio 4:3, and an interlace ratio of 2:1 by the standard-definition (SD) telecine apparatus 9. The SD telecine apparatus 9 includes in internal image sensor, not shown, which converts the motion picture film into an interlaced standard-definition video signal using 2–3 pulldown, and records the resulting interlaced standard-definition video signal on the SD-VTR 5.

As shown in FIG. 3, the interlaced standard-definition video signal recorded on, for example, the video disk 8 is reproduced by the video disk player 71 capable of reproducing video disks whereon an interlaced standard-definition video signal is recorded. Pictures represented by the reproduced interlaced standard-definition video signal are displayed on the display 55.

In the motion picture duplicating system shown in FIG. 1, the motion picture film 1 is converted by the HD telecine apparatus 61 or the SD telecine apparatus 9 into an interlaced standard-definition video signal. However, the arrangement shown may not provide an optimum vertical resolution.

When the pictures represented by the interlaced standard-definition video signal recorded on the video disk 8 are displayed on the display 55, the vertical resolution is impaired because the pictures are displayed using interlaced scanning with an interlace ratio of 2:1.

As explained in *Multidimensional Signal Processing for TV Images*, NIKKAN KOGYO SHINBUN-SHA, pp. 97–101, when a video signal is derived from an image using interlaced scanning, the effective vertical resolution of the image is Kc times the number of effective lines. Kc is normally called the Kell factor, but is called the camera factor in the paper, and is less than unity. Moreover, the effective vertical resolution of a picture displayed by interlaced scanning is $\alpha$ times the number of lines. The factor $\alpha$ is called the interlace factor in the paper, and, again, is less than unity. Consequently, the vertical resolution of the picture displayed on the display 55 (FIG. 3) is Kc×$\alpha$ times the number of lines.

Generally, both Kc and $\alpha$ are in the range of about 0.6 to about 0.8, so the vertical resolution of the picture displayed on the display 55 (FIG. 3) is in the range of about 0.4 to 0.6 times the number of lines.

It has been proposed to increase the vertical resolution obtained when an interlaced standard-definition video signal is derived from the motion picture film 1 using the HD telecine apparatus 61 or the SD telecine apparatus 9 by increasing the camera factor Kc to a value close to 1. However, since the picture is displayed by interlaced scanning, increasing the camera factor Kc results in interline flicker.

When an interlaced standard-definition video signal is derived from an image having points spanning more than one line using a large camera factor Kc, points in the image that appear in, for example, the odd field disappear when the even field is displayed. This causes the points to appear to move between alternate fields, which results in an annoying flicker called interline flicker.

Accordingly, to avoid interline flicker when the video signal is displayed using interlaced scanning, a camera factor Kc in the range of about 0.6 to about 0.8 is preferable. This causes the point to appear in both fields, but reduces the vertical resolution.

Efforts have been made recently to develop extended-definition television (EDTV). EDTV is intended to display a high resolution picture, without exhibiting visible flicker. EDTV is also intended to maintain downward compatibility with interlaced standard-definition video signals, i.e., NTSC video signals in the United States and Japan. Among the recently proposed EDTV systems, one displays a higher-quality picture by increasing the vertical resolution of the picture by using progressive, i.e., non-interlaced, scanning.

However, it is difficult to maintain downward compatibility with interlaced standard-definition video signals while providing the ability to display pictures with a high picture quality without having flicker. Consequently, an effective system that is downwards compatible with interlaced standard-definition video signals, and that is also capable of displaying a picture with a high picture quality has not yet been proposed.

OBJECTS AND SUMMARY OF THE INVENTION

Accordingly, it is an object of the present invention to provide a system capable of displaying a high resolution picture without adversely affecting downward compatibility.

The invention therefore provides apparatus for deriving from a motion picture film a video signal for transfer to a video recording medium. The video signal has an increased vertical resolution, and is for display using progressive scanning. The apparatus comprises a deriving system, a flag signal generating circuit and a recording system. The deriving system derives the video signal from the motion picture film. The flag signal generating circuit generates a flag signal indicating that the video signal is for display using progressive scanning. The recording system records the video signal and the flag signal in the recording medium.

The invention also provides a method of deriving an interlaced standard-definition video signal from a interlaced high-definition video signal. The interlaced standard-definition video signal having an increased vertical resolution. In the method, the interlaced high-definition video signal is converted into a progressive high-definition video signal. The interlaced high-definition video signal includes plural frames, and each frame includes a number of pixels. The number of pixels in each frame of the progressive high-definition video signal is reduced to provide a frame of a progressive standard-definition video signal. Finally, the progressive standard-definition video signal is converted into the interlaced standard-definition video signal.

The invention further provides an apparatus for deriving from a motion picture film including plural frames an interlaced standard-definition video signal for recording on recording medium. The interlaced standard-definition video signal has an increased vertical resolution. The apparatus comprises a system for deriving an interlaced high-definition video signal from the motion picture film. The interlaced high-definition video signal includes plural frames, and each frame is derived from one frame of the motion picture film. The apparatus also includes a circuit for converting the interlaced high-definition video signal into a progressive high-definition video signal. The progressive high-definition video signal includes plural frames, and each frame includes a number of pixels. The apparatus further includes circuits for reducing the number of pixels in each frame of the progressive high-definition video signal to provide a frame of a progressive standard-definition video signal, and for converting the progressive standard-definition video signal into the interlaced standard-definition video signal. Finally, the apparatus includes a circuit for adding to the interlaced standard-definition video signal a flag signal indicating that the interlaced standard-definition signal has an increased vertical resolution.

An apparatus according to the invention for reproducing a video signal recorded on a recording medium comprises a system for reproducing the video signal from the recording medium, and a circuit for extracting from the video signal reproduced from the recording medium a flag signal indicating a scanning mode wherein the video signal is to be displayed.

Finally, a display apparatus according to the invention includes a circuit for receiving a flag signal indicating a scanning mode in which the video signal is to be displayed, and for providing a control signal indicating the scanning mode in which the video signal is to be displayed; and a circuit, responsive to the video signal and the control signal, for displaying the motion picture in the scanning mode in which the video signal is to be displayed.

BRIEF DESCRIPTION OF THE DRAWINGS

FIG. 5A is a block diagram the down-converter according to the invention in the transfer system according to the invention.

FIG. 5B illustrates the state of the video signal as it passes through the down converter 4 according to the invention.

FIG. 6 is a block diagram of the filter 24 shown in FIG. 5A.

FIG. 7 is a diagram explaining the operation of the filter 24 shown in FIG. 5A.

FIG. 9A is a table showing the structure of the an MPEG video_sequence.

FIG. 9B is a table showing the structure of the extension_and_user_data(i) portion of the MPEG video_sequence.

FIG. 9C is a table showing the possible values of the extension_ID of the extension_start_code in the MPEG video_sequence FIG. 9D is a table showing the structure of the picture_coding_extension of the MPEG video_sequence.

FIGS. 11, 12, and 13 are block diagrams of additional embodiments of the reproducing-and-displaying system according to the invention.

DETAILED DESCRIPTION OF THE INVENTION

Figure 1:
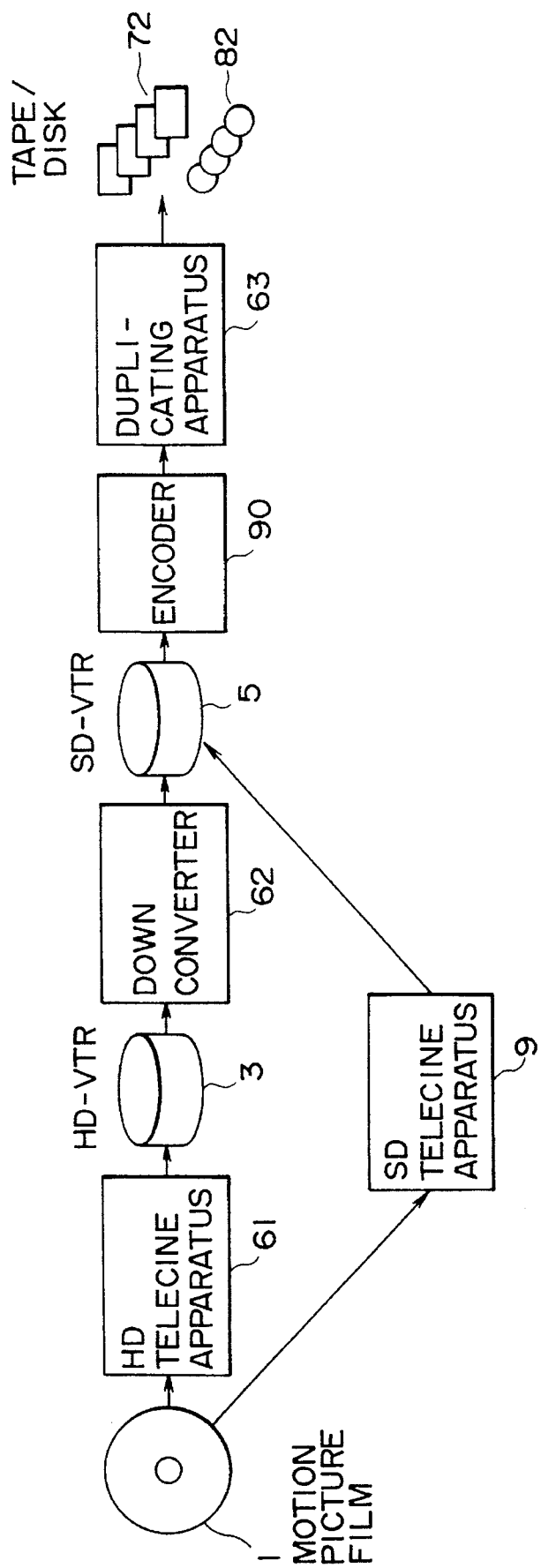
FIG. 1 is a block diagram of a known system for transferring a motion picture film to consumer video tapes and video disks.
Figure 2:
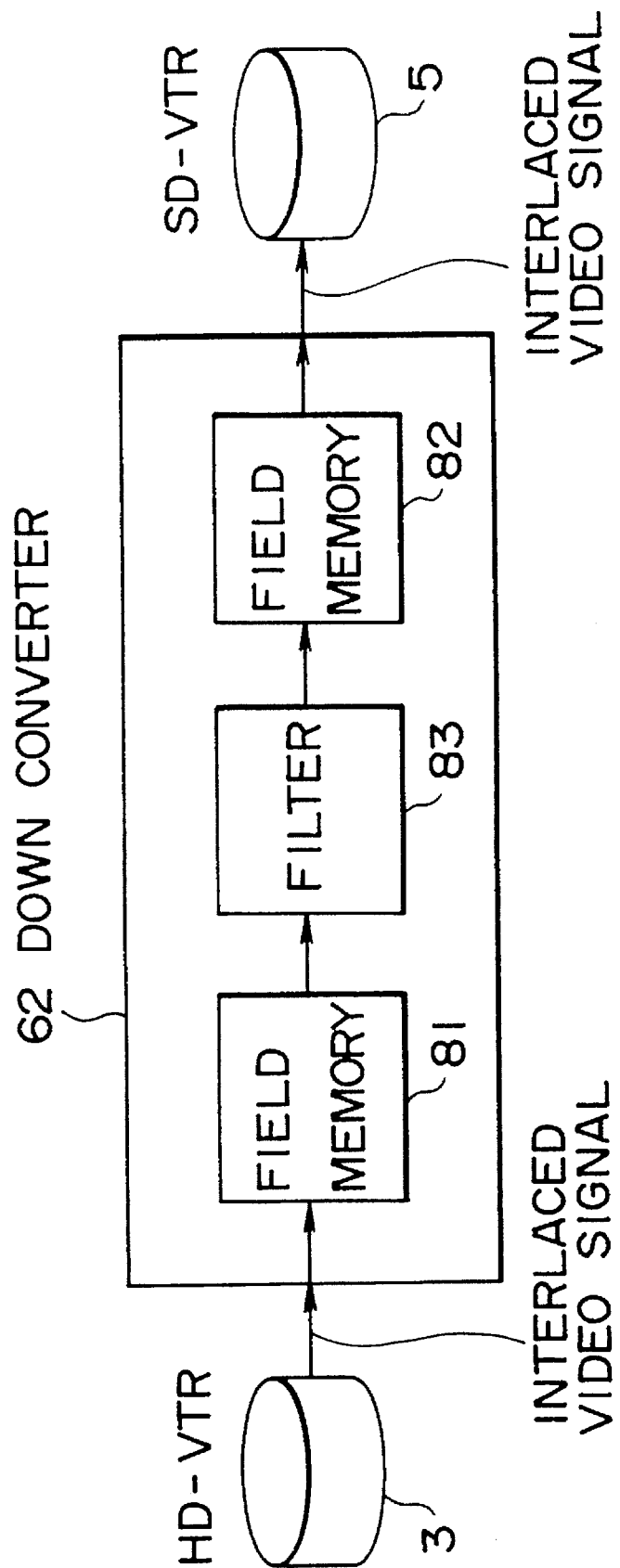
FIG. 2 is a block diagram of the down-converter 62 in the transfer system shown in FIG. 1.
Figure 3:
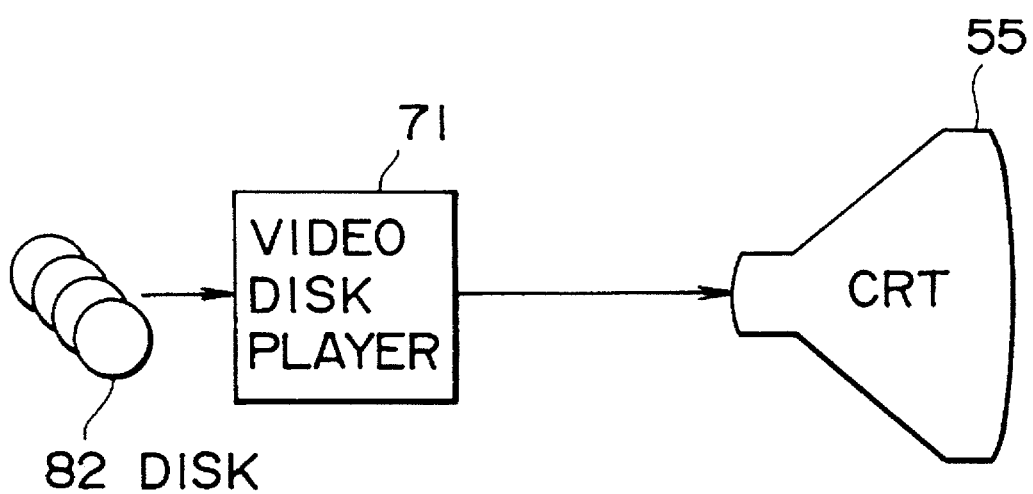
FIG. 3 is a block diagram of a known reproducing and displaying system.
Figure 4:
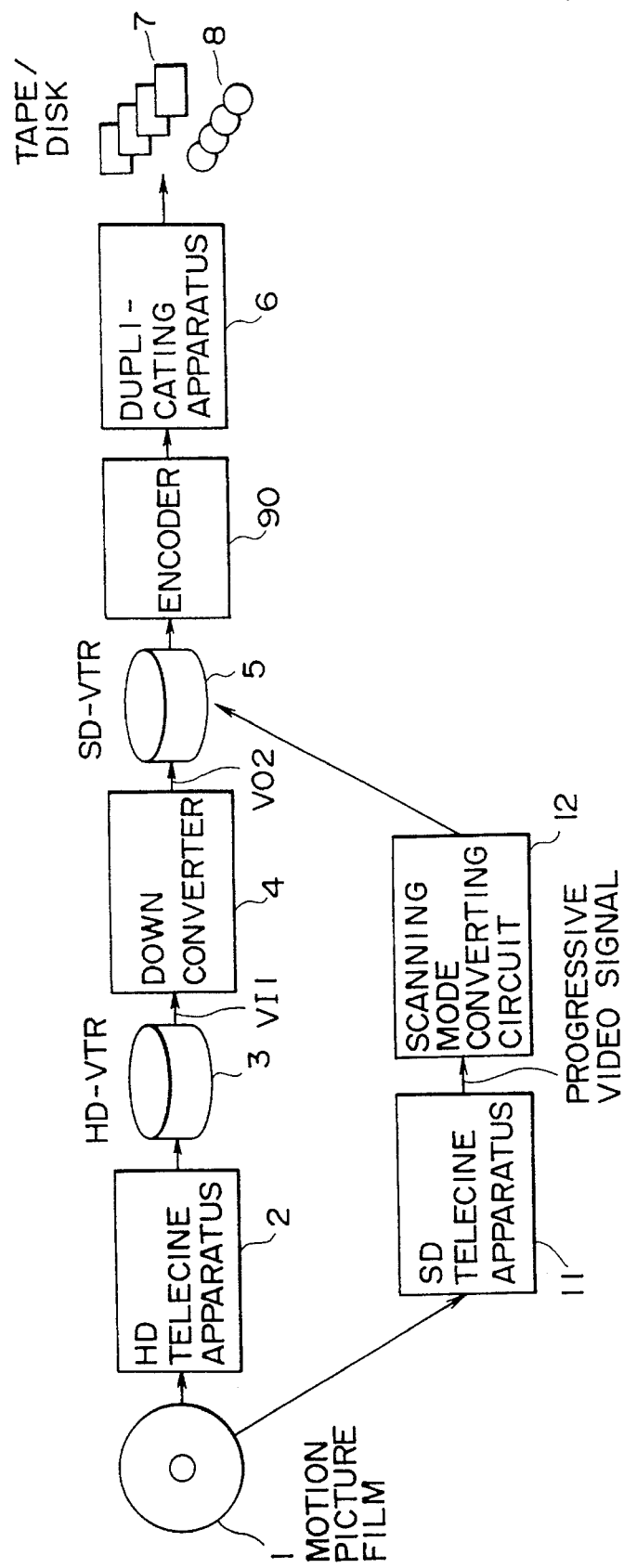
FIG. 4 is block diagram of a system according to the invention for transferring a motion picture film to consumer video tapes and video disks.

FIG. 4 is a block diagram of a telecine system employing an image processing apparatus embodying the present invention. In FIG. 4, components like or corresponding to those described above with reference to FIG. 1 are indicated by the same reference characters. The high-definition (HD) telecine apparatus 2 is provided internally with a high-definition image sensor, not shown, on which an image of each frame of the motion picture film is formed, and which generates a high-definition video signal representing each frame of the motion picture fill. The HD telecine apparatus 2 scans the image of each frame of the motion picture film 1 to generate from each frame of the motion picture film a frame of an interlaced high-definition video signal with 1125 lines and an aspect ratio of 16:9.

The interlaced high-definition video signal has an interlace ratio of 2:1, i.e., each frame of the video signal is represented by two overlapping fields offset from one another by one line. As mentioned above, where ever reference is made to an interlaced video signal, it will be understood that the interlaced video signal has an interlace ratio of 2:1.

The HD telecine apparatus 2 derives each frame of an interlaced high-definition video signal from one frame of the motion picture film 1 using 2–2 pulldown, in which two fields (one frame) of the interlaced high-definition video signal are derived from each frame of the motion picture film 1.

The high-definition video recorder (HD-VTR) 3 temporarily records the 48 fields per second (48-field) interlaced high-definition video signal from the HD telecine apparatus 2 on a recording medium, not shown, such as a video tape.

The HD-VTR 3 reproduces the interlaced high-definition video signal from the recording medium, and feeds the resulting reproduced high-definition video signal VI1 to the down-converter 4.

FIG. 5A shows the down-converter 4, which is an embodiment of the image converting apparatus according to the present invention. The down converter 4 converts the 48-field interlaced high-definition signal VI1 from the HD-VTR 3 into a 24 frames per second (24-frame) progressive (non-interlaced) high-definition signal VI2 before the down conversion process. After down conversion, the down converter 4 converts the 24-frame progressive standard definition video signal VO1 to the interlaced standard-definition signal VO2.

The down-converter 4 includes the memory unit 21 which converts the 48-field interlaced high-definition video signal VI1 from the HD-VTR 3 into the 24-frame progressive high-definition video signal VI2. The down-converter 4 also includes the filter 24 which filters the 24-frame progressive high-definition video signal VI2 to convert the 24-frame progressive high-definition video signal VI1 into the 24-frame progressive standard-definition video signal VO1. Finally, the down-converter 4 includes the memory unit 25, which converts the 24-frame progressive standard-definition video signal VO1 into the interlaced standard-definition signal VO2.

The memory unit 21 includes the memory banks 22a and 22b, and the switches 23a and 23b. The switch 23a switches between the inputs of the memory banks 22a and 22b at the same rate as, and in synchronism with, the field rate of the 48-field high-definition video signal VI1. This connects the fields of the video signal VI1 alternately to the memory banks 22a and 22b. Consequently, alternate fields of the video signal VI1 are stored in the memory banks 22a and 22b. For example, the memory bank 22a temporarily stores the odd fields of the video signal VI1, whereas the memory bank 22b temporarily stores the even fields of the video signal VI1.

The switch 23b switches between the outputs of the memory banks 22a and 22b at the same rate as, and in synchronism with, the line rate of the 24-frame progressive high-definition video signal VI2 fed to the filter 24. This connects the memory banks 22a and 22b alternately to the filter 24, so that the odd lines of the 24-frame progressive high-definition video signal VI2 originate in the memory bank 22a, and the even lines of the 24-frame progressive high-definition video signal VI2 originate in the memory bank 22b.

Thus, the memory unit 21 converts each frame (two fields) of the 48-field interlaced high-definition video signal VI1 from the HD-VTR 3 into a frame of the 24-frame progressive high-definition video signal VI2, which it feeds to the filter 24.

The filter 24 is, for example, a two-dimensional 3×3 filter having the configuration shown in FIG. 6. The 24-frame progressive high-definition video signal VI2 is fed from the memory unit 21 into the delay circuit (D) 32a, the multiplier 33a and the line memory 31a. The delay circuit 32a delays the video signal VI2 by one pixel period, which is the time corresponding to one pixel of the high-definition video signal, and feeds the resulting delayed video signal to the delay circuit 32b and the multiplier 33b. The delay circuit 32b delays the delayed video signal from the delay circuit 32a by one pixel period, and feeds the additionally-delayed video signal to the multiplier 33c.

The multipliers 33a through 33c multiply the video signal VI2, the video signal from the delay circuit 32a, and the video signal from the delay circuit 32b by the weighting factors $a_{11}$, $a_{12}$ and $a_{13}$, respectively. The respective output signals of the multipliers 33a through 33c are fed into the summing circuit 34.

The line memory 31a delays the high-definition video signal VI2 from the memory unit 21 by one line period, which is the time corresponding to one line of the high-definition video signal VI2, and feeds the one-line delayed video signal to the delay circuit 32c, the multiplier 33d, and the line memory 31b. The delay circuit 32c delays the one-line delayed video signal from the line memory 31a by one pixel period, and feeds the resulting delayed video signal to the delay circuit 32d, and the multiplier 33e. The delay circuit 32d delays the video signal from the delay circuit 32c by an additional one pixel period, and feeds the additionally-delayed video signal to the multiplier 33f.

The multipliers 33d through 33f multiply the one-line delayed video signal from the line memory 31a, the video signal from the delay circuit 32c, and the video signal from the delay circuit 32d by the weighting factors $a_{21}$, $a_{22}$, and $a_{23}$, respectively. The output signals from the multipliers 33d through 33f are fed to the summing circuit 34.

The line memory 31b delays the high-definition video signal from the line memory 31a by an additional line period, and feeds the two-line period delayed video signal to the delay circuit 32e and the multiplier 33g. The delay circuit 32e delays the two-line delayed high-definition video signal from the line memory 31b by one pixel period, and feeds the resulting delayed video signal to the delay circuit 32f and the multiplier 33h. The delay circuit 32f delays the video signal from the delay circuit 32e by an additional one pixel period, and feeds the additionally-delayed video signal to the multiplier 33i.

The multipliers 33g through 33i multiply the two-line delayed video signal from the line memory 31b, the video signal from the delay circuit 32e, and the video signal from the delay circuit 32f by the weighting factors $a_{31}$, $a_{32}$, and $a_{33}$, respectively. The output signals from the multipliers 33g through 33i are fed into the summing circuit 34.

The summing circuit 34 generates the output signal VO1 by adding together the outputs of the multipliers 33a through 33i.

FIG. 7 shows an example of the operation of the filter 24, in which the filter 24 calculates the filtered value E' of the pixel E from the pixel E and the eight pixels A, B, C, D, F, G, H, and I horizontally and vertically surrounding the pixel E using the following equation:

$$E' = a_{11} \times A + a_{12} \times B + a_{13} \times C +$$
$$a_{21} \times D + a_{22} \times E + a_{23} \times F +$$
$$a_{31} \times G + a_{32} \times H + a_{33} \times I$$

The filter 24 thins out the lines and the pixels of each frame of the 24-frame progressive high-definition video signal VI2 received from the memory unit 21. In this way, the 24-frame progressive high-definition video signal VI2 is converted into a 24-frame progressive standard-definition video signal VO1 having 525 lines and an aspect ratio of 4:3.

If it is acceptable for the consumer recording medium, such as the video cassette 7 and the video disk 8, recorded by the duplicating apparatus 6 to have a format that is incompatible with the conventional recording medium, such as the video cassette 72 and the video disk 82 recorded on the duplicating apparatus 63, the 24-frame progressive standard-definition video signal VO1 may be fed directly to the duplicating apparatus 6 for copying onto the consumer recording medium.

Otherwise, the 24-frame progressive standard-definition video signal is fed from the filter 24 to the memory unit 25 (FIG. 5A). The memory unit 25 comprises the memory banks 26a and 26b, and the switches 27a and 27b. The switch 27a is synchronized to the line rate of the 24-frame progressive standard-definition video signal and connects the output of the filter 24 alternately to the memory banks 26a and 26b during each line of the signal. Thus, for example, odd lines (even lines) of the progressive standard-definition video signal are fed to the memory bank 26a, and even lines of the progressive standard-definition video signal are fed to the memory bank 26b.

The memory bank 26a sequentially stores the odd lines of the 24-frame progressive standard-definition video signal received from the filter 24 via the switch 27a. The memory bank 26b sequentially stores the even lines of the 24-frame progressive standard-definition video signal received from the filter 24 via the switch 27a. Consequently, odd fields consisting of odd lines and even fields consisting of even lines of a 48-field interlaced standard-definition video signal are stored in the memory bank 26a and the memory bank 26b, respectively.

If it is acceptable for the consumer recording medium, such as the video cassette 7 and the video disk 8 recorded by the duplicating apparatus 6 to have a format that is incompatible with the conventional consumer recording medium, such as the video cassette 72 and the video disk 82, recorded on the duplicating apparatus 63, but it is nevertheless desired to record an interlaced video signal on the consumer recording medium, the switch 27b may be caused to operate at the field rate of a 48-field interlaced standard definition video signal to connect the memory banks 26a and 26b alternately to the standard definition video recorder (SD-VTR) 5. The 48-frame interlaced standard-definition video signal is then reproduced by the SD-VTR 5, and fed to the duplicating apparatus 6, for copying onto the consumer recording medium, such as the video cassette 7 and the video disk 8.

To provide a video signal for recording on a consumer recording medium, such as the video cassette 7 and the video disk 8, such that the consumer recording medium has recorded thereon a video signal that is downwards compatible with an existing reproducing-and-display apparatus, the switch 27b operates at the field rate of a 60 field per second (60-field) interlaced standard definition video signal to connect the memory banks 26a and 26b alternately to the standard definition video recorder (SD-VTR) 5. By operating at 60 Hz, the switch 27b performs 3-2 pull-down to convert the fields of a 48-field interlaced standard-definition video signal stored in the memory banks 26a and 26 to the 60-field interlaced standard-definition video signal VO2. The switch 27b feeds the odd fields stored in the memory bank 26a and the even fields stored in the memory bank 26b in the alternating sequence to be described next to the SD-VTR 5.

The switch 27b performs 3:2 pull down as follows. The switch 27b first feeds a first field (an odd field) from the memory bank 26a, the second field (an even field) from the memory bank 26b, the third field (art odd field) from the memory bank 26a and the fourth field (an even field) from the memory bank 26b to the SD-VTR 5. The switch 27b then returns to the memory bank 26a, which still contains the third field. The switch 27b then feeds the third field (an odd field) from the memory bank 26a to the SD-VTR 5 for a second time. The switch 27b then switches to the memory bank 26b, and feeds the sixth field (art even field) to the SD-VTR 5. The switch 26b returns to the memory bank 26a, the contents of which have now changed to the fifth field, and feeds the fifth field (an odd field) to the SD-VTR 5. The switch 27b then feeds the eighth field (an even field) from the memory bank 26b, and the seventh field from the memory bank 26a to the SD-VTR 5. After feeding the seventh field from the memory bank 26a, the switch 27b returns to the memory bank 26b, which still contains the eighth field. The switch 27b then feeds the eighth field from the memory bank 26b to the SD-VTR 5 for a second time. The switch 27b then returns to the memory bank 26a and the sequence then repeats. In the way just described, ten fields of the 60-field interlaced standard-definition video signal VO2 are derived from every eight fields of the 48-field interlaced standard-definition video signal stored in the memory banks 26a and 26b.

The state of the video signal as it passes through the down converter 4 (FIG. 5A) is illustrated in FIG. 5B. In a practical apparatus, the switches 23a and 23b and the switches 27a and 27b are realized using memory controllers controlling the write addresses and the read addresses of the respective memory banks 22a and 22b, and 26a and 26b.

In the manner described above, the memory unit 25 converts the 24-frame progressive standard-definition video signal into the 60-field interlaced standard-definition video signal VO2, and feeds the 60-field interlaced standard-definition video signal to the SD-VTR 5. The SD-VTR 5 (FIG. 4) records the 60-field interfaced standard-definition video signal VO2 from the down-converter 4 on a recording medium, such as a video tape.

As described above, the vertical resolution of the 48-field interfaced high-definition video signal provided by the telecine apparatus 2 is reduced by the product of the number of lines, i.e., 1125, and the camera factor Kc. However, even if the camera factor Kc=0.6, i.e., the smallest value in the above-mentioned range of the camera factor, the vertical resolution is still greater than the number of effective lines in a 60-field interlaced standard-definition video signal, which is usually about 480 lines in the NTSC system.

Since the down-converter 4 converts the 48-field interlaced high-definition video signal VI1 having a high vertical resolution into the 24-frame progressive high-definition video signal VI2, and converts the 24-frame progressive high-definition video signal VI2 into the 24-frame interlaced standard-definition video signal VO1, the vertical resolution of the 60-field interlaced standard-definition video signal VO2 from the down-converter 4 is substantially equal to the number of effective lines in the 60-field interlaced standard-definition video signal VO2. The signal provided by the down converter 4 will therefore be referred to as the increased vertical resolution (IVR) 60-field interlaced standard-definition video signal VO2. The IVR 60-field interlaced standard-definition video signal VO2 can be recorded by the SD-VTR 5, a conventional VTR.

The IVR 60-field interlaced standard-definition video signal VO2 recorded by the SD-VTR 5 is reproduced by the SD-VTR 5, and fed to the encoder 70. The encoder 70 converts the IVR 60-field interlaced standard-definition video signal VO2 reproduced by the SD-VTR 5 into an IVR composite video signal, such as an IVR NTSC composite video signal or an IVR PAL composite video signal, and feeds the resulting IVR composite video signal to the duplicating apparatus 6. The duplicating apparatus 6 makes copies of the IVR composite video signal on a consumer recording medium, such as the video cassette 7 or the video disk 8. Alternatively, the duplicating apparatus 6 can make copies of the IVR composite video signal on industrial or professional recording media. Further, the duplicating system 6 can be a distribution system, such as a broadcast, cable, telephone, or ISDN distribution system, through which the signal from the SD-VTR 5 is distributed to the end user. Hence all references herein to consumer recording medium will be understood also to include industrial and professional recording media, and such distribution media as broadcast, cable, telephone, or ISDN.

Since the IVR composite video signal recorded on the consumer video medium, such as the video cassette 7 or the video disk 8, is an interlaced video signal and has a high vertical resolution, interline flicker occurs when the IVR composite video signal is displayed in the interlaced scanning mode of a standard TV broadcasting system. Consequently, the resulting pictures are perceived as having a poor picture quality.

Pictures of satisfactory picture quality can be obtained when the IVR composite video signal recorded on the consumer recording medium, such as the video cassette 7 or the video disk 8, is displayed using progressive, i.e., non-interlaced, scanning. To enable the scanning mode to be automatically switched to progressive scanning when an IVR signal is to be displayed, the duplicating apparatus 6 is adapted to record scanning mode information on the end-user format medium in addition to the IVR composite video signal. The scanning mode information indicates that an IVR composite video signal is recorded on the consumer recording medium, and that the IVR composite video signal should be displayed using progressive scanning. The scanning mode information can be recorded in the Table of Contents (TOC) of the consumer recording medium, such as the video cassette 7 or the video disk 8.

Figure 8:
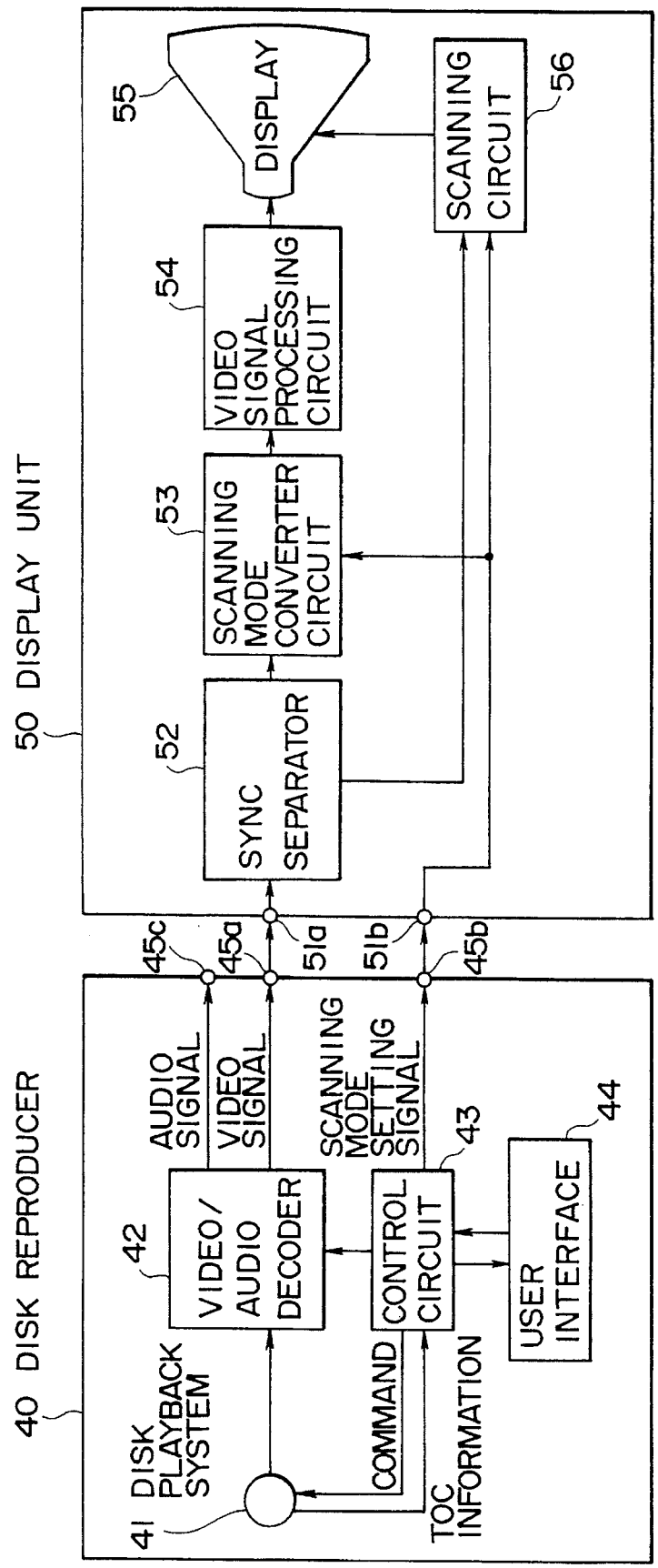
FIG. 8 is a block diagram of a reproducing-and-displaying system according to the invention.

FIG. 8 is a block diagram of a reproducing and displaying system embodying the present invention for reproducing and displaying the IVR composite video signal recorded on, for example, the video disk 8 by the duplicating apparatus 6 shown in FIG. 4. The IVR composite video signal is an 60-field interlaced standard-definition video signal with increased vertical resolution.

The reproducing and displaying system comprises the disk reproducer 40 and the display unit 50. The disk reproducer 40 comprises the disk playback system 41, the video/audio decoder 42, the control circuit 43, and the user interface 44. The disk reproducer 40 reproduces the information recorded on the disk 8 by the duplicating apparatus 6 shown in FIG. 4. The disk reproducer 40 is also capable of reproducing a conventionally-recorded disk, such as disk 72 recorded by the conventional duplicating apparatus 63 shown in FIG. 1.

When the disk reproducer 40 reproduces the information recorded on the disk 8, the control circuit 43 first causes the disk playback system 41 to read the Table of Contents (TOC) information recorded on the disk 8. The disk playback system 41 reproduces the information recorded on the disk 8, and feeds an RF signal to the video/audio decoder 42. The control circuit 43 causes the video/audio decoder 42 to decode the RF signal to provide a video signal and audio signal.

The video signal produced by the video/audio decoder 42 appears at the video terminal 45a, and the audio signal is fed to the audio output terminal 45c for connecting to a suitable amplifier and loudspeaker (not shown).

The control circuit 43 detects the scanning mode information included in the TOG information reproduced from the disk 8. When the control circuit 43 finds scanning mode information in the TOC information, indicating that the composite video signal recorded on the disk 8 is to be displayed using progressive scanning, the control circuit feeds a set scanning mode 0 signal to the scanning mode output terminal 45b to set the scanning mode of the display unit 50 to progressive scanning.

When the control circuit 43 finds no scanning mode information in the TOC information, it determines that the video signal recorded on the disk 8 is to be displayed using interlaced scanning, and feeds a set scanning mode 1 signal to the scanning mode output terminal 45b to set the scanning mode of the display unit 50 to interlaced scanning.

The user interface 44 includes a control panel, not shown, provided with, for example, a main switch, a playback button, a fast forward button, a rewind button, and the like. The user interface also includes indicators for showing the operational state of the disk reproducer 40, such as playback, fast forward, rewind, and the like. The user interface also displays the playing time of the information reproduced from the disk 8. The control circuit 43 controls the operation of the disk reproducer 40 in response to command signals entered by user operating the control panel. The control circuit 43 also provides information about the operational state of the disk reproducer 40, the playing time of the information recorded on the disk 8, which is known from the TOC information, and the like, to the user interface 44, for display to the user.

The display unit 50 comprises the sync separator circuit 52, the scanning mode converting circuit 53, the video signal processing circuit 54, the display 55, for example, a CRT, and the scanning circuit 56. The display unit 50 also includes the video input terminal 51a, and the scanning mode input terminal 51b for connection to the video output terminal 45a and the scanning mode output terminal 45b, respectively, of the disk reproducer 40.

The sync separator circuit 52 separates the synchronizing signals from the video signal fed from the disk reproducer 40 via the video output terminal 45a and the video terminal 51a. The sync separator circuit feeds the synchronizing signals to the scanning circuit 56, and feeds the remainder of the video signal to the scanning mode converting circuit 53.

The scanning mode converting circuit 53 sets the scanning mode of the video signal from the sync separator circuit 52 in response to the scanning mode setting signal received from the disk reproducer 40 via the scanning mode output terminal 45b and the scanning mode input terminal 51b. When the scanning mode convening circuit 53 receives the set scanning mode 1 signal from the disk reproducer 40, indicating that the video signal reproduced by the disk reproducer 40 from the disk 8 was recorded by the conventional duplicating apparatus shown in FIG. 1, and should be displayed using interlaced scanning, the scanning mode converting circuit 53 transfers the video signal received from the sync separator circuit 52 directly to the video signal processing circuit 54. The video signal processing circuit 54 processes the video signals from the scanning mode converting circuit 53 using a predetermined signal processing procedure, for example, NTSC decoding, and feeds the processed video signal to the display 55.

The set scanning mode 1 signal from the disk reproducer 40 is also fed to the scanning circuit 56. In response to the synchronizing signals provided by the sync separator circuit 52, the scanning circuit 56 provides scanning signals to drive the display 55 in interlaced scanning mode with a frame frequency of 30 Hz, i.e., the scanning circuit 56 provides scanning signal to drive the display 55 with a field rate of 60 Hz.

In the way just described, the display 55 in the display unit 50 displays pictures in the same manner as that in which a conventional display unit displays pictures.

When the scanning mode converting circuit 53 receives the set scanning mode 0 signal from the disk reproducer 40, indicating that the video signal recorded on the disk 8 is an increased vertical definition video signal recorded by the duplicating apparatus shown in FIG. 4, and should be displayed using progressive scanning, the scanning mode converting circuit 53 sets the scanning mode for scanning the video signal from the sync separator circuit 52 to progressive scanning.

When the video signal recorded on the disk 8 has an increased vertical resolution, interline flicker would occur if the video signal reproduced by the disk reproducer 40 were displayed using interlaced scanning. Therefore, the scanning mode converting circuit 53 converts the 60-field IVR composite video signal reproduced from the disk 8 into a 24-frame progressive standard-definition video signal.

The configuration of the scanning mode converting circuit 53 is similar, for example, to the memory unit 21 shown in FIG. 5A. The scanning mode converting circuit 53 detects and discards duplicate fields in the 60-field IVR interlaced standard-definition video signal from the sync separator 52. The scanning mode converting circuit 53 then interleaves the lines of the odd fields and the even fields of the resulting 48-field IVR interlaced standard-definition video signal so that the lines of the odd fields and the lines of the even lines are arranged alternately. This converts the 60-field IVR interlaced standard-definition video signal from the disk reproducer 40 into a 24-frame IVR progressive standard-definition video signal.

The set scanning mode 0 signal from the disk reproducer 40 is also fed to the scanning circuit 56. In response to the set scanning mode 0 signal, the scanning circuit 56 generates scanning signals to drive the display 55 in the progressive scanning mode with a frame frequency of 24 Hz. This way, pictures can be displayed on the display 55 with a high vertical resolution and without interline flicker.

With most video displays, displaying pictures with a frame rate of 24 Hz would produce severe flicker because of insufficient persistence in the display. To reduce this flicker, the scanning circuit 56 can generate scanning signals to drive the display 55 in the progressive scanning mode with a frame frequency of 48 Hz, and each frame of the 24-frame IVR progressive standard-definition video signal can be displayed twice. Even less flicker will result if the scanning circuit generates scanning signals to drive the display 55 in the progressive scanning mode with a frame frequency of 72 Hz, and each frame of the 24-frame IVR progressive standard-definition video signal is displayed three times.

The use of MPEG2 bit stream as the format of video signals will be now be described.

The MPEG standard requires that the video signal be formatted according to the MPEG standard with a structure defined by the video_sequence shown in FIG. 9A. The video_sequence includes a portion called extension_and_user_data(i) wherein extension_data and user_data are stored. FIG. 9B shows the structure of the extension_and_user_data(i) portion. The presence of an extension_start_ code in the extension_and_user_data(i) portion indicates that the data following the extension_start_code is extension_data(i).

The first four bits following the extension_start_code(i) provide the extension_ID which specifies the type of the extension_data. FIG. 9C shows the extension_ID table in which the different types of extension_data indicated by the possible values of the four-bit extension_ID code are shown. An extension_ID of 1000 indicates a picture_coding_extension, the structure of which is shown in FIG. 9D.

The picture_coding_extension includes a non_interlaced_frame flag. The non_interlaced_flag is in its 0 state indicates that a frame consisting of two fields is an image scanned by interlaced scanning, whereas flag in its 1 state indicates that a frame is an image scanned by progressive scanning. This flag provides information equivalent to "scanning information indicating the scanning mode of the image" in the present invention.

Figure 10:
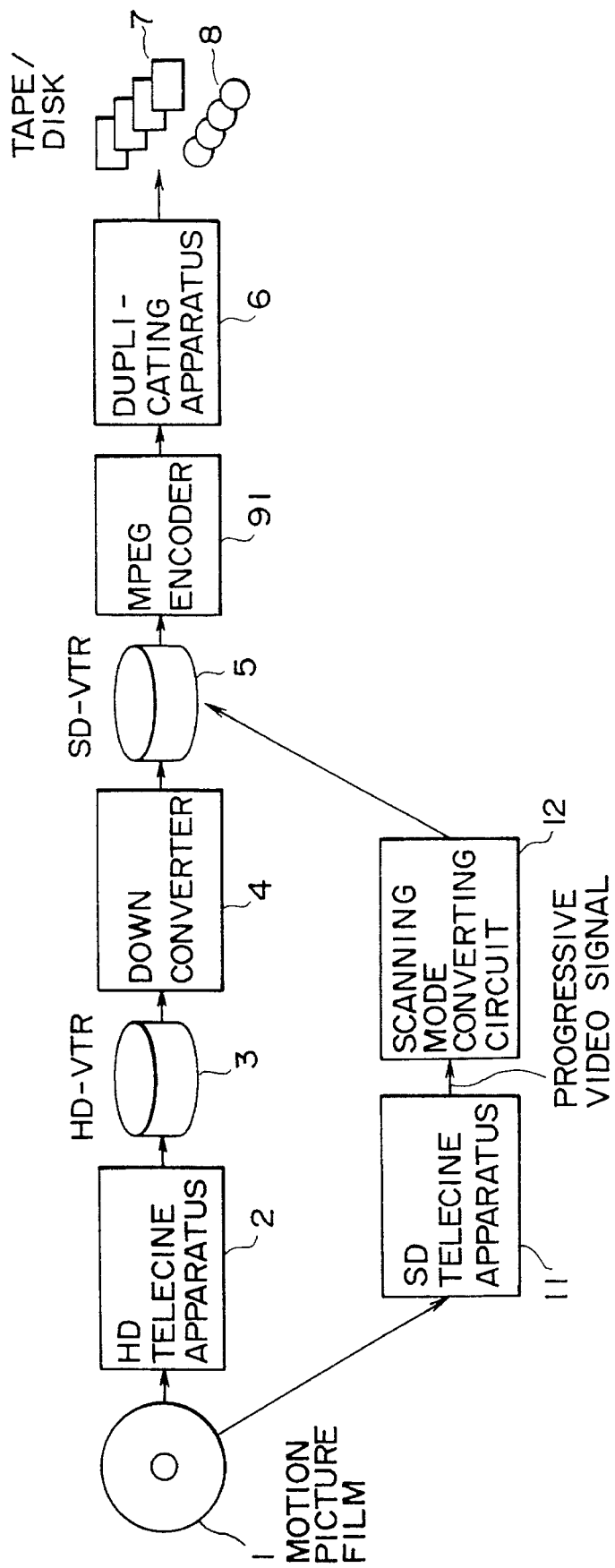
FIG. 10 is a block diagram of a different embodiment of a system according to the invention for transferring a motion picture film to consumer video tapes and video disks in which the signal recorded on the consumer recording mediums is in accordance with the MPEG standard.

FIG. 10 shows a telecine system in an embodiment according to the present invention employing the MPEG system. Components corresponding to those in the telecine system shown in FIG. 4 are indicated by the same reference numerals. The SD-VTR 5 feeds the reproduced 60-field IVR interlaced standard-definition video signal to the MPEG encoder 91. The MPEG encoder 91 encodes the video signal it receives according to the MPEG2 standard, and feeds the resulting MPEG-encoded video signal to the duplication apparatus 6. Since the video signal received by the MPEG video encoder 91 is intended for display by sequential scanning, the MPEG encoder sets the non_interlace_frame flag to its 1 state.

The MPEG-encoded signal generated by the MPEG encoder 91 is interlaced similarly to a conventional MPEG-encoded signal, and the duplicating apparatus 6 makes copies of the MPEG-encoded signal from the MPEG encoder on the consumer video cassette 7 or video disk 8. The MPEG encoder 91 includes the signal indicating that the signal recorded on the video disk or video cassette should be displayed using sequential scanning, i.e., the non_interlaced_frame flag, in the picture_coding_extension of the video_sequence including the video signal. Thus, the signal indicating that the signal recorded on the video cassette or the video disk should be displayed using sequential scanning is recorded on the video cassette 7 or video disk 8 as part of the MPEG-encoded signal recorded thereon.

Figure 11:
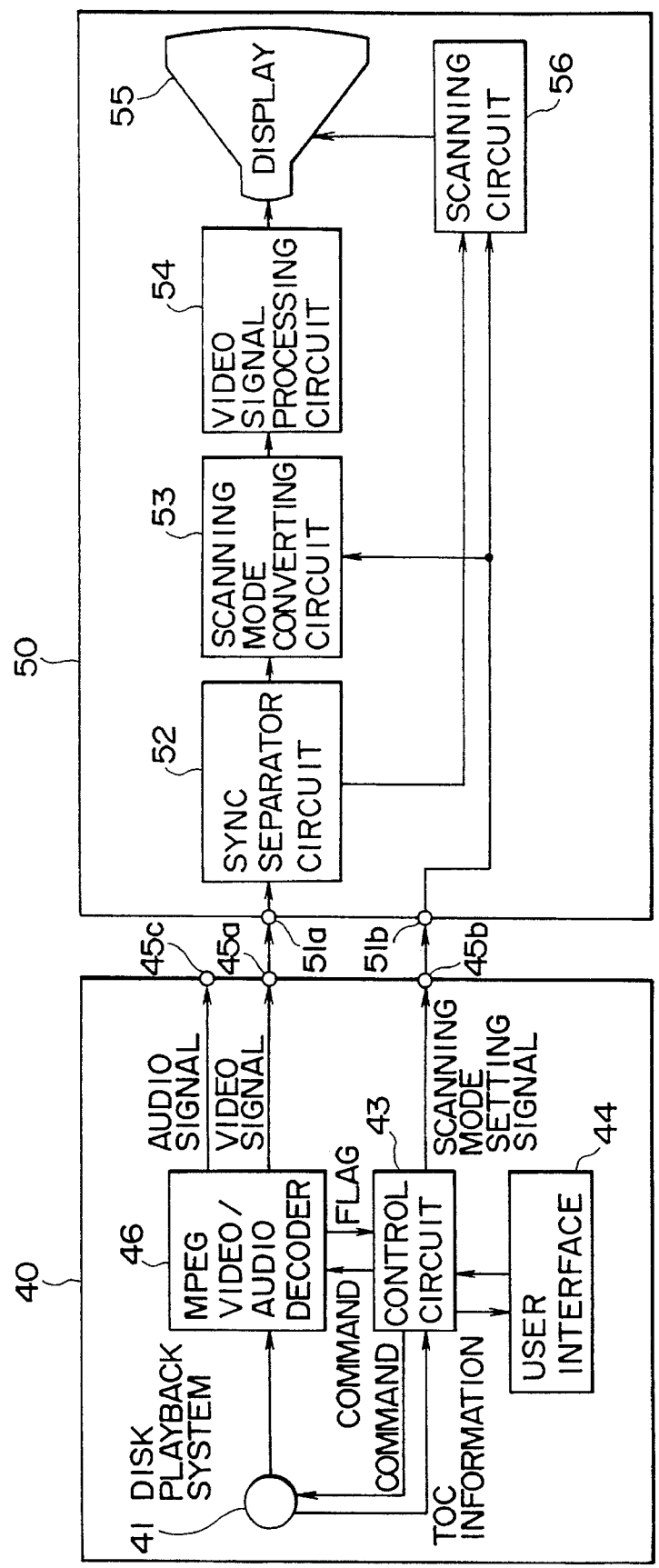

FIG. 11 is a block diagram of a reproducing-and-displaying system in a preferred embodiment according to the present invention for reproducing the video signal recorded on, for example, the video disk 8 by the duplicating apparatus 6 shown in FIG. 10, and for displaying the reproduced video signal. The configuration of the reproducing-and-displaying system shown in FIG. 11 is substantially the same as that of the reproducing-and-displaying system shown in FIG. 8, except that the former is provided with a MPEG video/audio decoder 46 instead of the video/audio decoder 42. Components corresponding to those in the reproducing-and-displaying system shown in FIG. 8 are indicated by the same reference numerals.

In the disk reproducer 40, the control circuit 43 causes the disk playback system 41 to read table of contents (TOC) information from the video disk 8, and receives the TOC dam. The disk playback system 41 reproduces the MPEG-encoded signal recorded on the video disk 8 and feeds an RF signal to the MPEG video/audio decoder 46. Then, the control circuit 43 causes the video/audio decoder 46 to decode the RF signal received from the disk playback system 41 to derive therefrom a video signal and an audio signal.

The video signal produced by the MPEG video/audio decoder 46 is fed to the video output terminal 45*a*, and the audio signal is fed to the audio output terminal 45*c* for connection to a suitable amplifier and loudspeaker, not shown.

The MPEG video/audio decoder 46 extracts the non_interlaced_frame flag from the picture_coding_extension of the video_sequence of the MPEG-encoded signal decoded from the RF signal, and transfers the flag to the control circuit 43. The non_interlaced_frame flag in its 1 state indicates to the control circuit 43 that the video signal derived from the MPEG-encoded signal reproduced from the video disk 8 is an increased vertical resolution (IVR) video signal, and is to be displayed using progressive scanning. Consequently, the control circuit 43 feeds the set scanning mode 0 signal to the scanning mode output terminal 45*b* to set the display unit 50 to sequential scanning. The non_interlaced_frame flag in its 0 state indicates to the control circuit 43 that the video signal derived from the MPEG-encoded signal reproduced from the disk 8 is a conventional video signal, and is to be displayed using interlaced scanning. Consequently, the control circuit 43 feeds the set scanning mode 1 signal to the scanning mode output terminal 45*b* to set the display unit 50 to interlaced scanning.

The operation of the display unit 50 is identical with that of the display unit 50 described above with reference to FIG. 8, and hence will not be described again here.

Figure 12:
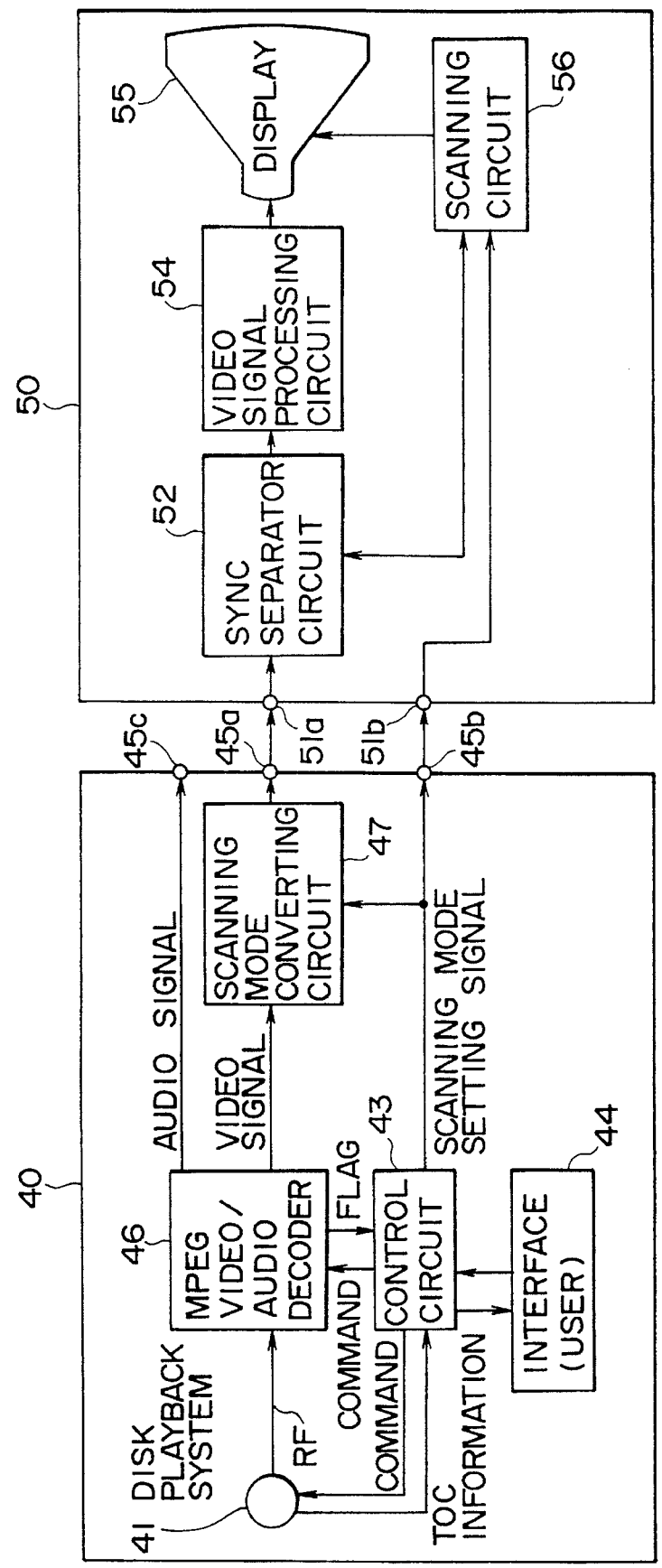

FIG. 12 shows a reproducing-and-displaying system in which the scanning mode converting circuit 47 is included in the disk reproducer 40 instead of being included in the display unit 50, as the scanning mode converting circuit is in the reproducing-and-displaying system shown in FIG. 11. The scanning mode converting circuit 47 provides a video signal having a scanning mode set according to the set scanning mode signal received from the control circuit 43. The decoded video signal with its scanning mode set as just described is fed to the display unit 50 via the video output terminal 45*a* and the video input terminal 51*a*. The display unit 50 displays the video signal from the disk reproducer 40 in response to scanning signals supplied by the scanning circuit 56. The scanning mode of the scanning circuit is specified by the set scanning mode signal also received from the disk reproducer 40 via the set scanning mode output terminal 46*b* and the set scanning mode input terminal 51*b*.

The scanning mode converting circuit 47 operates in the same way as the scanning mode converting circuit 53 described above with reference to FIG. 8, and so will not be described again here. The scanning circuit 56 in the display unit 50 operates in response to the set scanning mode signal in the same way as described above with reference to FIG. 8, so will not be described again here.

In a further alternative embodiment, not shown, the MPEG video/audio decoder and the scanning mode converting circuit are relocated to the display unit, and operate in response to the RF signal from the disk playback system in the disk reproducing unit.

In the embodiments described above, a video tape reproducer (not shown) reproducing the consumer video cassette 7 may be substituted for the disk reproducer 40 reproducing the consumer video disk 8.

As shown in FIG. 13, the IVR interlaced standard-definition video signal may originate from a broadcast, cable, or telephone video distribution system, and the circuitry described above may distributed between the converter box 40 and the display unit 50. Alternatively, all of the circuits shown in FIG. 13 may be located in the display Unit 50, which would then be a television receiver or monitor. In FIG. 13, the selector 48 operates in response to the control circuit 43, to select the channel or program chosen by the user using the user interface. When the signal on the selected channel is determined to be a signal encoded according to the MPEG standard, the MPEG-encoded signal is passed to the MPEG decoder 46. The MPEG decoder extracts the non_interlaced_frame flag from the MPEG-encoded signal, and feeds it to the control circuit 43. The control circuit 43 generates the set scanning mode signal which is provided to the display unit 50 to cause the display trait to display the video signal decoded from the MPEG-encoded signal in the appropriate scanning mode, as described above.

From the foregoing description it can be seen that, since the scanning mode in which the video signal is to be displayed is determined by scanning mode information included in the video signal, or recorded on the consumer recording medium, such as the video cassette 7 or the video disk 8, downward compatibility with interlaced standard-definition video signals can be obtained, and pictures having a high vertical resolution can be displayed with a high picture quality without interline flicker.

In the duplicating apparatus shown in FIG. 4, the HD telecine apparatus 2, the HD-VTR 3 and the down-converter 4 may be replaced by the standard-definition (SD) telecine apparatus 11 having an image sensor (not shown) capable of convening the frames of the motion picture film 1 into a standard-definition video signal. The SD telecine apparatus 11 provides a progressive standard-definition video signal with 525 lines and an aspect ratio 4:3. The scanning mode convening circuit 12 then converts the progressive standard-definition video signal into an interlaced standard-definition video signal for recording on the SD-VTR 5. The scanning mode convening circuit 12 would be similar to the down-converter 4 shown in FIG. 5A, but would lack the filter 24.

Although illustrative embodiments of the invention have been described herein in detail, it is to be understood that the invention is not limited to the precise embodiments described, and that various modifications may be practiced within the scope of the invention defined by the appended claims.

We claim:

1. Apparatus for reproducing a video signal recorded on a recording medium, the apparatus comprising:

reproducing means for reproducing the video signal from the recording medium; and extracting means for extracting from the video signal reproduced from the recording medium a flag signal indicating a scanning mode with which the video signal is to be displayed, wherein the flag signal indicates that the video signal is to be displayed using a progressive scanning mode and the apparatus further comprising:

display means for displaying a motion picture in response to the video signal reproduced by the reproducing means; and scanning means for scanning the display means in the scanning mode indicated by the flag signal, wherein the video signal reproduced from the recording medium has a scanning mode different from the scanning mode indicated by the flag signal; and the apparatus additionally comprises means, receiving the video signal reproduced from the recording medium, and operating in response to the flag signal, for converting the scanning mode of the video signal reproduced from the recording medium into the scanning mode indicated by the flag signal.

2. The apparatus of claim 1, wherein:

the video signal recorded on the recording medium includes a table of contents containing the flag signal;

the reproducing means reproduces the video signal including the table of contents; and the extracting means extracts the flag signal from the table of contents reproduced by the reproducing means.

3. The apparatus of claim 1, wherein:

the video signal recorded on the recording medium is an MPEG-encoded video signal including a non_interlace_frame flag as the flag signal;

the reproducing means reproduces the MPEG-encoded video signal including the non_interlace_frame flag from the recording medium; and the extracting means includes:

decoding means for decoding the MPEG-encoded signal to extract the video signal and the non_interlace_frame flag, and means for generating the flag signal in response to the non_interlace_frame flag extracted by the decoding means.

4. Apparatus for reproducing a video signal recorded on a recording medium, the apparatus comprising:

reproducing means for reproducing the video signal from the recording medium;

extracting means for extracting from the video signal reproduced from the recording medium a flag signal indicating a scanning mode with which the video signal is to be displayed;

display means for displaying a motion picture in response to the video signal reproduced by the reproducing means; and scanning means for scanning the display means in the scanning mode indicated by the flag signal, wherein:

the video signal reproduced from the recording medium has a scanning mode different from the scanning mode indicated by the flag signal; and the apparatus additionally comprises means, receiving the video signal reproduced from the recording medium, and operating in response to the flag signal, for converting the scanning mode of the video signal reproduced from the recording medium into the scanning mode indicated by the flag signal.

5. Apparatus for reproducing a video signal recorded on a recording medium, the apparatus comprising:

reproducing means for reproducing the video signal from the recording medium; and extracting means for extracting from the video signal reproduced from the recording medium a flag signal indicating a scanning mode with which the video signal is to be displayed wherein:

the video signal reproduced from the recording medium has a scanning mode different from the scanning mode indicated by the flag signal; and the apparatus additionally comprises converting means, receiving the video signal reproduced from the recording medium, and operating in response to the flag signal, for converting the scanning mode of the video signal reproduced from the recording medium into the scanning mode indicated by the flag signal, the input video signal reproduced from the recording medium being an interlaced, standard-definition video signal including plural frames, each of the frames including an odd field and an even field, each field including plural lines, and the flag signal indicating a scanning mode of a progressive video signal having a greater vertical resolution than a conventional interlaced, standard-definition video signal having an equal number of lines, the converting means including:

a first odd field memory and a first even field memory, means for writing the odd field of each one of the frames of the input video signal into the first odd field memory and for writing the even field of the one of the frames of the input video signal into the first even field memory;

means for feeding the odd lines of each one of the frames of the progressive video signal from the first odd field memory, and for feeding the even lines of the one of the frames of the progressive video signal from the first even field memory.

6. The apparatus of claim 5, the input video signal reproduced from the recording medium being an interlaced, standard-definition video signal including plural frames, each of the frames including an odd field and an even field, each field including plural lines, and the flag signal indicating a scanning mode of a progressive video signal having a greater vertical resolution than a conventional interlaced, standard-definition video signal having an equal number of lines, the converting means including:

a first odd field memory and a first even field memory, means for writing the odd field of each one of the frames of the input video signal into the first odd field memory and for writing the even field of the one of the frames of the input video signal into the first even field memory;

means for feeding the odd lines of each one of the frames of the progressive video signal from the first odd field memory, and for feeding the even lines of the one of the frames of the progressive video signal from the first even field memory.

7. Apparatus for displaying a motion picture in response to a video signal, the video signal having a scanning mode, the apparatus comprising:

receiving means for receiving a flag signal indicating a scanning mode in which the video signal is to be displayed, and for providing a control signal indicating the scanning mode in which the video signal is to be displayed; and means, responsive to the video signal and the control signal, for displaying the motion picture in the scanning mode in which the video signal is to be displayed, wherein:

the video signal has a scanning mode different from the scanning mode in which the video signal is to be displayed;

the apparatus additionally comprises means, receiving the video signal and responsive to the control signal, for converting the scanning mode of the video signal to provide a scan-converted video signal having the scanning mode in which the video signal is to be displayed; and display means for displaying the motion picture in response to the scan-converted video signal.

8. Apparatus for displaying a motion picture in response to a video signal, the video signal having a scanning mode, the apparatus comprising:

receiving means for receiving a flag signal indicating a scanning mode in which the video signal is to be displayed, and for providing a control signal indicating the scanning mode in which the video signal is to be displayed; and means, responsive to the video signal and the control signal, foe displaying the motion picture in the scanning mode in which the video signal is to be displayed, wherein:

the means for displaying the motion picture comprises:

display means for displaying the motion picture in response to the video signal; and scanning means for scanning the display means in a scanning mode determined by the control signal, the video signal has a scanning mode different from the scanning mode in which the video signal is to be displayed; and the apparatus additionally comprises converting means, receiving the video signal and responsive to the control signal, for converting the scanning mode of the video signal to provide a scan-converted video signal having the scanning mode in which the video signal is to be displayed;

the display means displays the motion picture in response to the scan-converted video signal.

9. The apparatus of claim 8, the video signal being an interlaced, standard-definition video signal including plural frames, each of the frames including an odd field and an even field, each field including plural lines, and the flag signal indicating a scanning mode of a progressive video signal having a greater vertical resolution than a conventional interlaced, standard-definition video signal having an equal number of lines, the converting means including:

a first odd field memory and a first even field memory, means for writing the odd field of each one of the frames of the input video signal into the first odd field memory and for writing the even field of the one of the frames of the input video signal into the first even field memory;

means for feeding the odd lines of each one of the frames of the progressive video signal from the first odd field memory, and for feeding the even lines of the one of the frames of the progressive video signal from the first even field memory, wherein the display means displays the motion picture in response to the progressive video signal.

10. Apparatus for displaying a motion picture in response to a video signal, the video signal having a scanning mode, the apparatus comprising:

receiving means for receiving a flag signal indicating a scanning mode in which the video signal is to be displayed, and for providing a control signal indicating the scanning mode in which the video signal is to be displayed; and means, responsive to the video signal and the control signal, for displaying the motion picture in the scanning mode in which the video signal is to be displayed, wherein:

the scanning mode of the video signal is interlaced scanning; and the scanning mode in which the video signal is to be displayed is progressive scanning.

11. The apparatus of claim 10, wherein:

the apparatus additionally comprises means, receiving the video signal and responsive to the control signal, for converting the scanning mode of the video signal to provide a scan-converted video signal having the scanning mode in which the video signal is to be displayed; and the means for displaying the motion picture displays the motion picture in response to the scan-converted video signal.

12. The apparatus of claim 10, wherein the means for displaying the motion picture comprises:

display means for displaying the motion picture in response to the video signal; and scanning means for scanning the display means in a scanning mode determined by the control signal.

13. The apparatus of claim 12, wherein:

the video signal has a scanning mode different from the scanning mode in which the video signal is to be displayed; and the apparatus additionally comprises means, receiving the video signal and responsive to the control signal, for converting the scanning mode of the video signal to provide a scan-converted video signal having the scanning mode in which the video signal is to be displayed;

the display means displays the motion picture in response to the scan-converted video signal.

14. The apparatus of claim 10, wherein:

the video signal is reproduced from a recording medium; and the receiving means receives the flag signal reproduced from the recording medium.

15. The apparatus of claim 14, wherein:

the video signal includes a table of contents including the flag signal; and the receiving means is for receiving the table of contents and for generating the control signal in response to the flag signal in the table of contents.

16. The apparatus of claim 14, wherein:

the video signal is a component of an MPEG-encoded signal including a non_interlace_frame flag as the flag signal;

the receiving means includes:
  means for receiving the MPEG-encoded signal, and
  means for decoding the video signal from the MPEG-encoded signal; and the receiving means provides the control signal in response to the non_interlace_frame flag.

17. Apparatus for reproducing a video signal recorded on a recording medium, the apparatus comprising:

reproducing means for reproducing the video signal from the recording medium; and extracting means for extracting from the video signal reproduced from the recording medium a flag signal indicating a scanning mode with which the video signal is to be displayed, wherein:

the flag signal indicates that the video signal is to be displayed using a progressive scanning mode, and the video signal reproduced from the recording medium has a scanning mode different from the scanning mode indicated by the flag signal; and the apparatus additionally comprises convening means, receiving the video signal reproduced from the recording medium, and operating in response to the flag signal, for convening the scanning mode of the video signal reproduced from the recording medium into the scanning mode indicated by the flag signal.

18. The apparatus of claim 17, wherein:

the video signal recorded on the recording medium includes a table of contents containing the flag signal;

the reproducing means reproduces the video signal including the table of contents; and the extracting means extracts the flag signal from the table of contents reproduced by the reproducing means.

19. The apparatus of claim 17, wherein:

the video signal recorded on the recording medium is an MPEG-encoded video signal including a non_interlace_frame flag as the flag signal;

the reproducing means reproduces the MPEG-encoded video signal including the non_interlace_frame flag from the recording medium; and the extracting means includes:
  decoding means for decoding the MPEG-encoded signal to extract the video signal and the non_interlace_frame flag, and
  means for generating the flag signal in response to the non_interlace_frame flag extracted by the decoding means.

20. The apparatus of claim 19, additionally comprising:

display means for displaying a motion picture in response to the video signal reproduced by the reproducing means; and scanning means for scanning the display means in the scanning mode indicated by the flag signal.

* * * * *

UNITED STATES PATENT AND TRADEMARK OFFICE
CERTIFICATE OF CORRECTION

PATENT NO. : 5,594,552

DATED : January 14, 1997

INVENTOR(S) : Yasushi Fujinami et al

It is certified that error appears in the above-indentified patent and that said Letters Patent is hereby corrected as shown below:

In col. 18, line 10, please change "foe" to --for--.

In col. 18, line 54, please insert --the video signal including-- before "a flag signal".

In col. 20, line 18, please replace "convening" with --converting--.

Signed and Sealed this

Twenty-ninth Day of April, 1997

Attest:

BRUCE LEHMAN

Attesting Officer

Commissioner of Patents and Trademarks